United States Patent Office 2,758,218
Patented Aug. 7, 1956

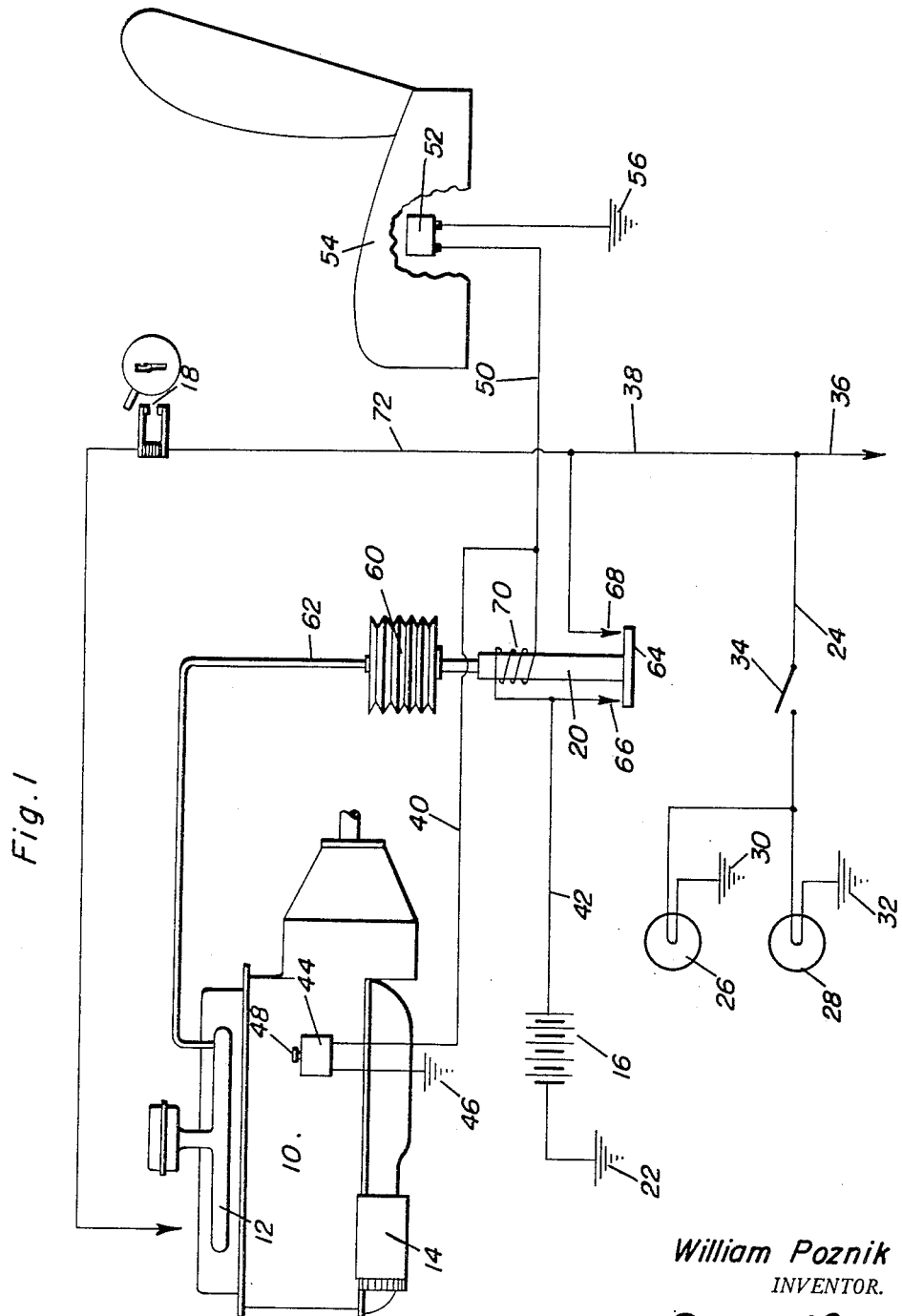

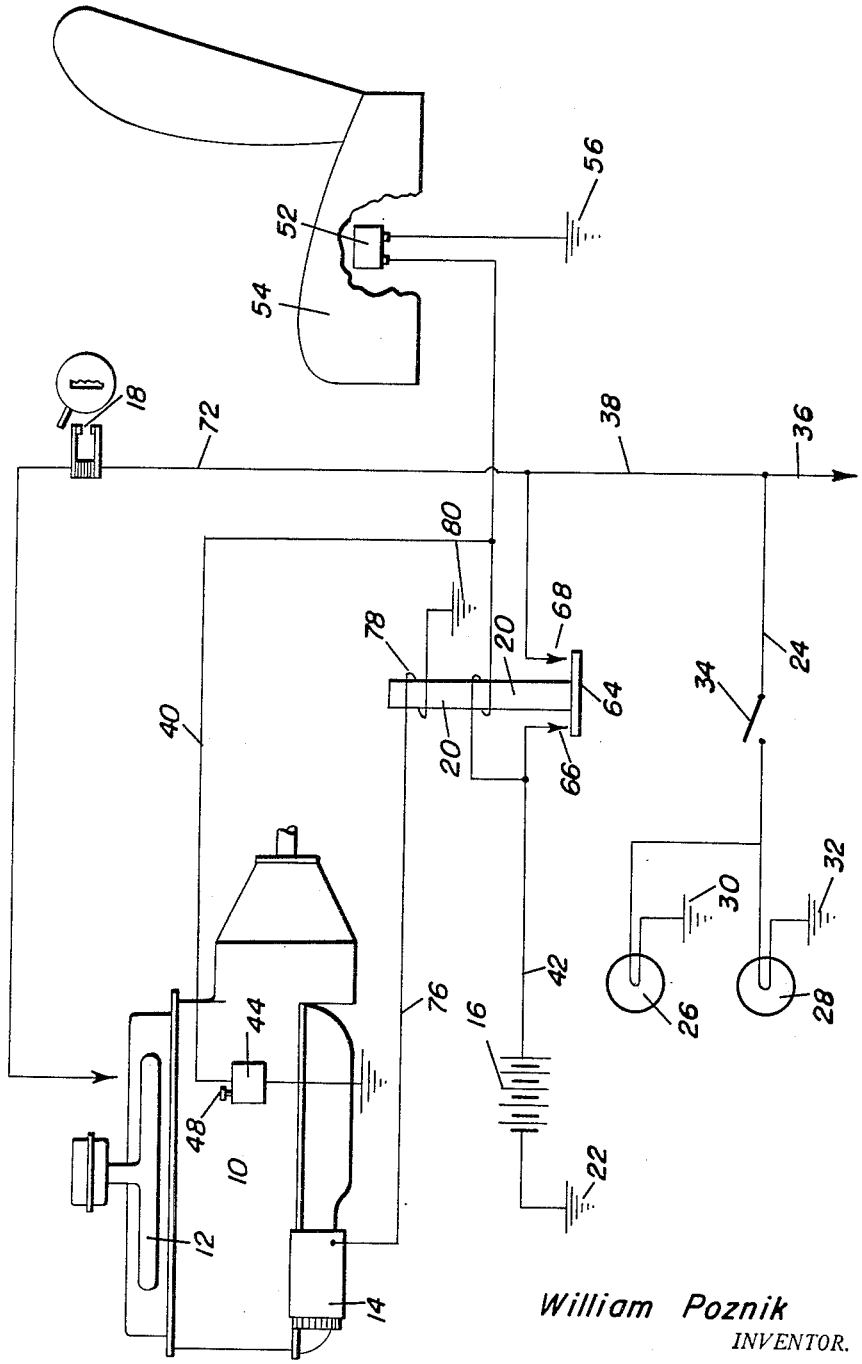

2,758,218

PROTECTIVE AUTOMATIC CIRCUIT BREAKING ARRANGEMENT FOR AUTOMOBILES

William Poznik, Redondo Beach, Calif.

Application June 2, 1953, Serial No. 359,174

1 Claim. (Cl. 307—10)

This invention relates to protective circuit breaking arrangements for automobiles and other motor vehicles, such as is disclosed and described in Patent No. 2,497,792, issued on February 14, 1950, and is a continuation-in-part of the application for Letters Patent, Serial No. 194,213, filed November 6, 1950, now Patent No. 2,669,664, February 16, 1954.

The primary object of this invention is to provide an automatic circuit breaking system which will prevent the continued current consumption in the circuits and installations of the automobile which are not utilized when the vehicle is parked, thus preventing partial or complete exhaustion of the battery provided in the vehicle. The construction of this invention features the use of a switch beneath the operator's seat of the vehicle in parallel with the thermostatic switch described in Patent No. 2,497,792 and one of two other means later described, for controlling a solenoid switch that in turn controls the current flow from the battery to the various power consuming circuits. This combination and/or arrangement is such that it permits the normal use of all the usual circuits but responds to an abnormal set of conditions which indicate abuse of the storage battery, and cuts the flow of current off from the storage battery. Further, this combination and/or arrangement in no way necessitates special operative procedures nor restricts the full and normal use of the various circuits.

One obvious advantage of this invention over my prior patent is the protection of the ignition circuit as well as the light circuits, etc.

Pneumatic and electromagnetic means for actuating the solenoid relay that controls the battery power under a particular condition is provided. One embodiment of the invention employs a vacuum actuated bellows which is connected to the intake manifold of the engine. This arrangement keeps the solenoid switch in circuit closed position when the engine is running.

Alternatively, a second concept includes the use of a coil about the armature of the solenoid switch which is adapted to keep the solenoid switch in a circuit closed position when the motor is running, this second coil being connected to the generator of the vehicle.

As is well known, the customary installation of the electrical components of a motor vehicle provides no means for preserving the battery of the vehicle from exhaustion if the operator neglects to switch off the headlights, radio or other current consuming appliances mounted in or on the car. The present invention provides means which makes a continuous supply of current to the current consuming circuits dependent either upon the running of the engine under load or upon the operator being seated on his seat in the automobile.

Still further objects of the invention reside in the provision of a protective system for automobiles that may be readily and easily installed in practically all current makes and models of automotive vehicles at a comparatively low cost.

These, together with the various ancillary objects and features of the invention which will become apparent as the following description proceeds, are attained by this protective system for automobiles, preferred embodiments of which have been illustrated in the accompanying drawings, by way of example only, wherein:

Figure 1 is a diagram of an embodiment of the invention employing the mechanical means including the vacuum actuated bellows for controlling the solenoid switch; and Figure 2 is another diagrammatical view illustrating an embodiment of the invention employing a generator actuated coil for controlling the solenoid switch when the motor is running.

With continuing reference to the accompanying drawings wherein like reference numerals designate similar parts throughout the various views, reference numeral 10 generally designates the conventional internal combustion engine as is used to power most automobiles and other vehicles. The engine 10 is provided with an intake manifold 12 connected to the carburetor thereof. A generator 14 is provided for providing electrical power to maintain the battery 16 in a charged state and to supply electrical current to the various auxiliary devices of the automobile or other vehicle when the car is in motion or when the engine 10 is operating.

The ignition system of the engine 10 is controlled by a conventional key operated ignition switch 18. Controlling the main supply circuit from the battery 16 is a solenoid switch 20.

As is conventional, the battery 16 is grounded, as at 22. Likewise, the current consuming circuits, such as the circuit 24 for the headlights 26 and 28, are grounded through individual grounds as at 30 and 32. A switch 34 is provided for controlling the headlight circuit 24. Other auxiliary current consuming circuits 36 are also connected to a conductor 38 leading to the solenoid switch 20.

A conductor 40 is interconnected with the main supply circuit 42 including the battery 16 and solenoid switch 20. The conductor 40 is connected to a thermostatic device 44 arranged with its heat responsive element in the immediate vicinity of the engine 10, and it closes the return or ground connection 46 of the conductor 40 when the temperature of the engine is at a predetermined level. The value of the temperature level is adjustable, as indicated at 48, so as to be in accord with the desired time period that current will be supplied to the various circuits although the engine is not running and the vehicle is unoccupied.

Also connected with the main supply circuit 42 and the solenoid 20 is a conductor 50 leading to a pressure responsive switch 52 mounted on the automobile beneath the seat cushion 54 of the operator's seat. The pressure responsive switch 52 is grounded as at 56.

Also controlling the position of the core of the solenoid switch 20 is a bellows 60 which is connected by a vacuum line 62 to the intake manifold 12 of the engine 10. Thus, when the engine 10 is operating, the vacuum caused by the suction at the manifold 12 will cause the bellows 60 to contract, thus holding the contact plate 64 of the solenoid switch 20 against the contacts 66 and 68.

The operator seating himself actuates the seat switch 52 completing a circuit from the battery 16 through the conductor 42 through the coil 70 of the solenoid switch 20 and through the seat switch 52 to the ground 56. This will cause the solenoid switch 20 to be actuated holding the plate 64 against the contacts 66 and 68 thus permitting flow of current through the conductor 72 and to the ignition switch 18. Closing the ignition switch 18 and starting the engine creates a vacuum in the bellows 60. If the driver were to leave the seat 54 at this time interrupting the current flow in coil 70 by breaking the circuit at the seat switch 52, the engine would remain running because the solenoid switch would be held in closed circuit position by the evacuated bellows 60 due to the running engine 10. This holding arrangement permits the driver to leave his seat even though the thermostatic device 44 has not been actuated by the still cold engine. This freedom of action on the driver's part at these first moments of engine operation permit him to perform such chores as closing the garage doors without the engine being shut off. However, if the engine is shut off, the solenoid switch will move to the open position due to the operation of the spring means included therein.

In the embodiment as is shown in Figure 2, all of the elements are similar, with the exception of the fact that the generator 14 is connected through a conductor 76 to a coil 78 and subsequently grounded at 80. The coil 78 is adapted to actuate the solenoid switch 20 so as to hold the solenoid switch 20 in a closed position when the engine is running, due to the fact that the generator 14 will then provide enough electrical power to actuate the solenoid switch 20.

Since from the foregoing, the construction and advantages of this protective arrangement for batteries in motor vehicles are readily apparent, further description is believed to be unnecessary. However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claim.

What is claimed as new is as follows:

An automatic protective circuit breaking system for an automobile driven by an engine comprising a main current supply circuit, current consuming devices and operative electrical circuits for said devices, a thermostatic switch device provided with a heat responsive element arranged in the immediate vicinity of the automobile engine and operated by the heat developed by said engine, a solenoid switch controlling said main current supply circuit, and means for actuating said solenoid switch including a pressure operated switch situated below the operator's seat in the automobile and adapted to energize said solenoid switch when the operator is seated on said seat, said means further including a bellows mechanically connected to said solenoid switch, and a vacuum line connecting said bellows with the intake manifold of said engine whereby upon operation of said engine, said bellows will hold said solenoid in a circuit closed position even though the operator is not seated on said seat thus not actuating said pressure operated switch.

References Cited in the file of this patent
UNITED STATES PATENTS

| | | |
|---|---|---|
| 704,616 | Charles | July 15, 1902 |
| 1,229,473 | Keenan | June 12, 1917 |
| 2,497,792 | Poznik | Feb. 14, 1950 |
| 2,606,626 | Meyer | Aug. 12, 1952 |
| 2,669,664 | Poznik | Feb. 16, 1954 |